United States Patent
Li et al.

(10) Patent No.: US 11,086,798 B2
(45) Date of Patent: Aug. 10, 2021

(54) METHOD AND COMPUTER PROGRAM PRODUCT AND APPARATUS FOR CONTROLLING DATA ACCESS OF A FLASH MEMORY DEVICE

(71) Applicant: Silicon Motion, Inc., Hsinchu County (TW)

(72) Inventors: Kuan-Te Li, Taipei (TW); Sheng-Hsun Lin, Magong (TW); Kuei-Sung Hsu, New Taipei (TW); Jian-Wei Sun, Taipei (TW)

(73) Assignee: SILICON MOTION, INC., Zhubei (TW)

( * ) Notice: Subject to any disclaimer, the term of this patent is extended or adjusted under 35 U.S.C. 154(b) by 67 days.

(21) Appl. No.: 16/728,888

(22) Filed: Dec. 27, 2019

(65) Prior Publication Data

US 2021/0011859 A1  Jan. 14, 2021

(30) Foreign Application Priority Data

Jul. 8, 2019  (TW) ................ 108124030

(51) Int. Cl.
*G06F 12/00* (2006.01)
*G06F 12/14* (2006.01)
*G06F 12/02* (2006.01)

(52) U.S. Cl.
CPC ...... *G06F 12/1483* (2013.01); *G06F 12/0246* (2013.01); *G06F 2212/7201* (2013.01); *G06F 2212/7205* (2013.01)

(58) Field of Classification Search
CPC .. G06F 12/1483; G06F 12/0246; G06F 12/10; G06F 12/1466; G06F 2212/7201; G06F 2212/7202; G06F 2212/7203; G06F 2212/7205; G06F 2212/7211
See application file for complete search history.

(56) References Cited

U.S. PATENT DOCUMENTS 10,303,394 B2 * 5/2019 Park ................. G06F 3/064
2018/0267902 A1 * 9/2018 Edwards ............ G06F 3/0685

OTHER PUBLICATIONS

Taiwanese Search Report for Taiwanese Application No. 108124030, dated Apr. 10, 2020, with an English translation.

* cited by examiner

*Primary Examiner* — Shawn X Gu
(74) *Attorney, Agent, or Firm* — Birch, Stewart, Kolasch & Birch LLP (57) ABSTRACT

The invention introduces a method for controlling data access to a flash memory, performed by a processing unit, including steps of: obtaining a logical address associated with a data read operation; determining whether a group table corresponding to the logical address is queued in a locked queue, or a hot zone of a swap queue; and prohibiting content of the locked queue and the swap queue from being modified when the group table corresponding to the logical address is queued in the locked queue, or the hot zone of the swap queue.

20 Claims, 11 Drawing Sheets

METHOD AND COMPUTER PROGRAM PRODUCT AND APPARATUS FOR CONTROLLING DATA ACCESS OF A FLASH MEMORY DEVICE

CROSS-REFERENCE TO RELATED APPLICATIONS

This application claims Patent Application No. 108124030, filed in Taiwan on Jul. 8, 2019; the entirety of which is incorporated herein by reference for all purposes.

BACKGROUND

The disclosure generally relates to storage devices and, more particularly, to methods, computer program products and apparatuses for controlling data access of a flash memory device.

Flash memory devices typically include NOR flash devices and NAND flash devices. NOR flash devices are random access a host accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation).

Since NAND flash devices are not random access devices, for improving the efficiency of data programming, a host may provide continuous data over a length, such as 128K bytes, enabling the flash memory device to program data into several storage sub-units thereof in parallel. To speed up the user-data access to the NAND flash devices, a random access memory (RAM) temporarily stores multiple maps and each map stores information indicating which physical locations the user data of the continuous logical locations are actually stored in. After successfully programming the user data of one logical location, the processing unit updates the information of the RAM to indicate a mapping between the logical location and the physical location that the user data thereof is actually stored. When reading user data of a specific logical location, the processing unit searches maps of the RAM to obtain the corresponding physical location, and then, reads out the user data of the physical location of a specific storage sub-unit. Since the RAM space is insufficient to store all maps, the processing unit selects a portion of the maps to temporarily store in the RAM. However, if the mapping information for user data to be read or programmed is not found in the RAM, the processing unit requires to read a corresponding map from a storage sub-unit and store that in the RAM, resulting in the great consumption in time, the computation capability of the processing unit, and the bandwidth of flash interface. Thus, it is desirable to have methods, computer program products and apparatuses for controlling data access of a flash memory device to overcome the above limitations.

SUMMARY

In an aspect of the invention, a method for controlling data access of a flash memory device, performed by a processing unit, is introduced to include: obtaining a logical address associated with a data read operation; determining whether a group table corresponding to the logical address is queued in a locked queue, or a hot zone of a swap queue; and prohibiting content of the locked queue and the swap queue from being modified when the group table corresponding to the logical address is queued in the locked queue, or the hot zone of the swap queue. The locked queue stores profile data about a group table of a random access memory (RAM) that has been modified but hasn't been programmed into a NAND flash memory. The swap queue stores profile data about a group table of the RAM that hasn't been modified and comprises the hot zone and a cold zone. The hot zone comprises m nodes from the top of the swap queue and the cold zone comprises n nodes from the bottom of the swap queue. Each node records profile data of one group table, and each profile data comprises a group-table number and a start address pointing to the corresponding group table stored in the RAM.

In another aspect of the invention, a non-transitory computer program product is introduced to include program code when being loaded and executed by a processing unit to perform the above method.

In still another aspect of the invention, an apparatus for controlling data access of a flash memory device, is introduced to include the RAM storing group tables; and a processing unit arranged to operably perform operations recited in the above method.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

Figure 1:
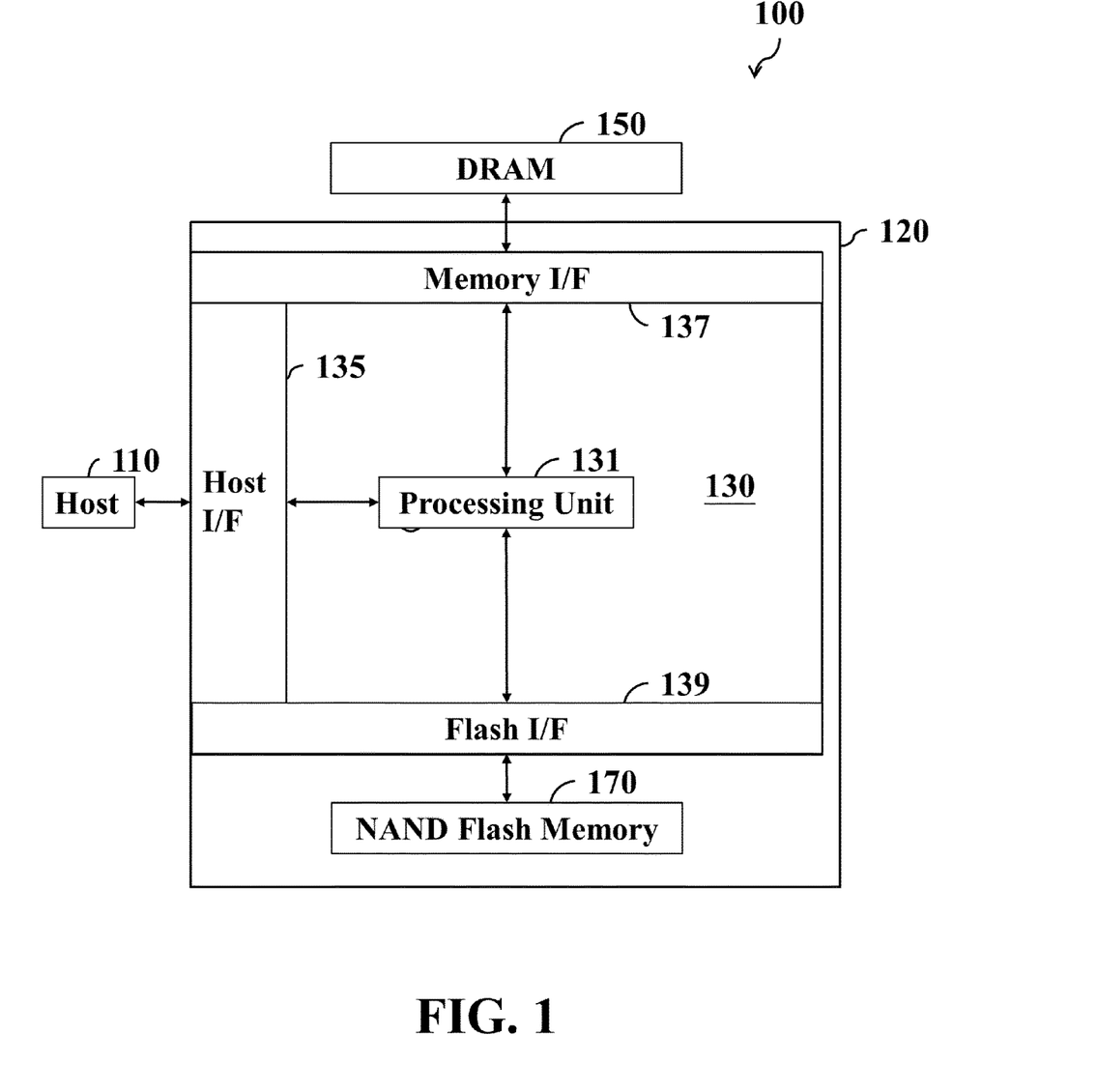
FIG. 1 is the system architecture of a flash memory device according to an embodiment of the invention.

Refer to FIG. 1. The system architecture 100 includes a host 110 and a data-storage device 120 including a memory controller 130 and a NAND flash memory 170. The data-storage device 120 may be optionally equipped with a dynamic random access memory (DRAM) 150. The system architecture 100 may be practiced in a personal computer (PC), a laptop PC, a tablet PC, a mobile phone, a digital camera, a digital recorder, or other consumer electronic products. The memory controller 130 is an application-specific Integrated circuit (ASIC) for controlling the data retrieval to the DRAM 150 and the NAND flash memory 170, which includes a processing unit 131, a host interface (I/F) 135, a memory I/F 137 and a flash I/F 139. The NAND flash memory 170 provides huge storage space, typically in hundred gigabytes (GBs) or even terabytes (TBs), for storing huge user data, for example, high-resolution images, videos, or others. Memory units of the NAND flash memory 170 may be Triple Level Cells (TLCs) or Quad-Level Cells (QLCs). The DRAM 150 may be used to buffer user data came from the host 110 and to be programmed into the NAND flash memory 170, user data read come from the NAND flash memory 170 and to be output to the host 110, a portion of or all the logical-to-physical address mapping (L2P) table that is required for lookup, or a L2P table to be programmed into the NAND flash memory 170.

The memory controller 130 includes a processing unit 131 and communicates with the host 110 through the host I/F 135. The host I/F 135 may be Universal Flash Storage (UFS), Non-Volatile Memory Express (NVMe), Universal Serial Bus (USB), Advanced Technology Attachment (ATA), Serial Advanced Technology Attachment (SATA), Peripheral Component Interconnect Express (PCI-E), or others. Any of the host 110 and the processing unit 131 may be implemented in numerous ways, such as with general-purpose hardware (e.g., a single processor, a multiprocessor or graphics processing units (GPUs) capable of parallel computations, or others) that is programmed using firmware or software instructions to perform the functions recited herein. A multiprocessor is a single computing component with two or more independent processors (called cores), which read and execute program instructions.

The processing unit 131 may communicate with the NAND flash memory 170 via the flash I/F 139, for example, using Open NAND Flash Interface (ONFI), DDR toggle, or others. The processing unit 131 may communicate with the DRAM 150 via the memory I/F 137, for example, using Double Data Rate Third Generation (DDR3), Double Data Rate Fourth Generation (DDR4), or others.

Figure 2:
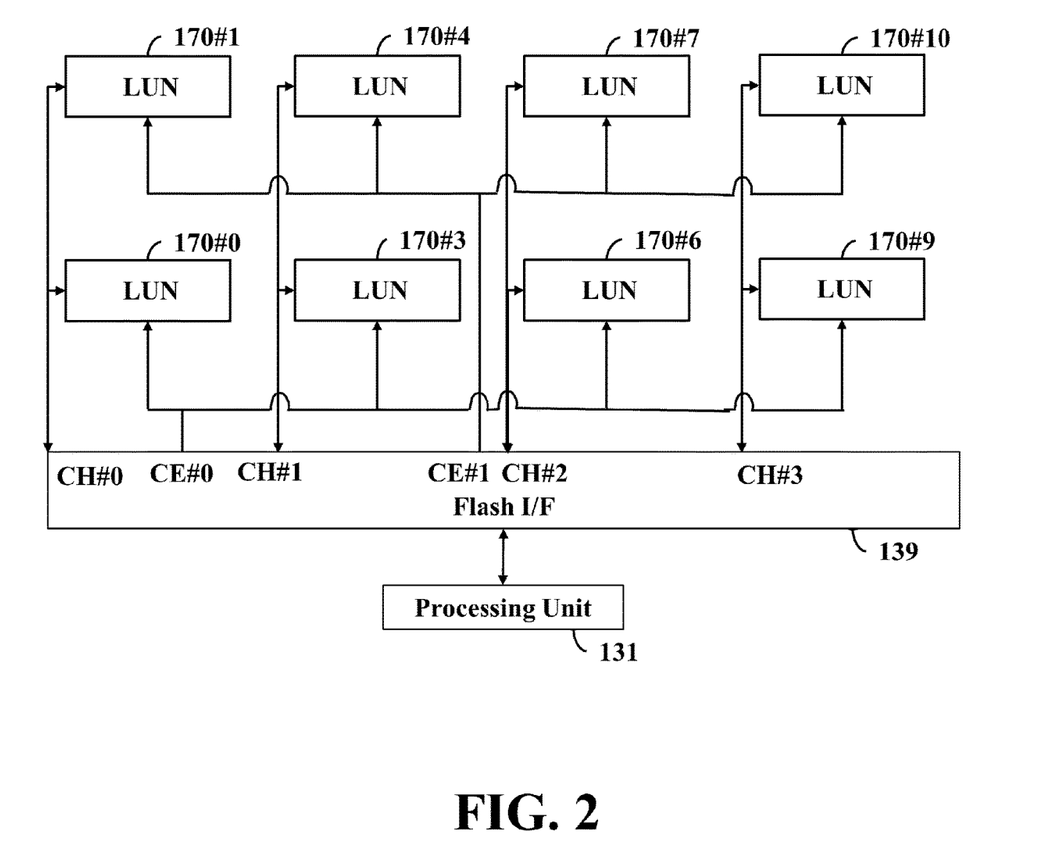
FIG. 2 is a schematic diagram showing the connectivity between a flash interface (I/F) and logical unit numbers (LUNs).

Refer to FIG. 2. The flash I/F 139 may include four I/O channels (hereinafter referred to as channels CHs) CH #0 to CH #3. Each channel is connected to storage devices being identified by Logical Unit Numbers (LUNs). For example, the channel CH #0 is connected to the LUNs 170#0 to 170#1, the channel CH #1 is connected to the LUNs 170#3 to 170#4, and so on. In other words, multiple LUNs can share one channel and the LUN is the minimum unit that can be controlled by a Chip Enable (CE) signal.

To record the mappings between logical locations (managed by the host 110) and physical locations (managed by the memory controller 130), the memory controller 130 maintains a L2P table for storing information indicating which physical address data (also referred to as user data) of each logical address is physically stored in sequentially, enabling the memory controller 130 to search the corresponding physical address when dealing with a read or write command associated with a specific logical address. The data-storage device 120 may not be equipped with the DRAM 150, or may be equipped with limited capacity of the DRAM 150, referred to as a partial DRAM. In the aforementioned architectures, the DRAM 150 cannot provide sufficient space to store the whole L2P table.

Figure 3:
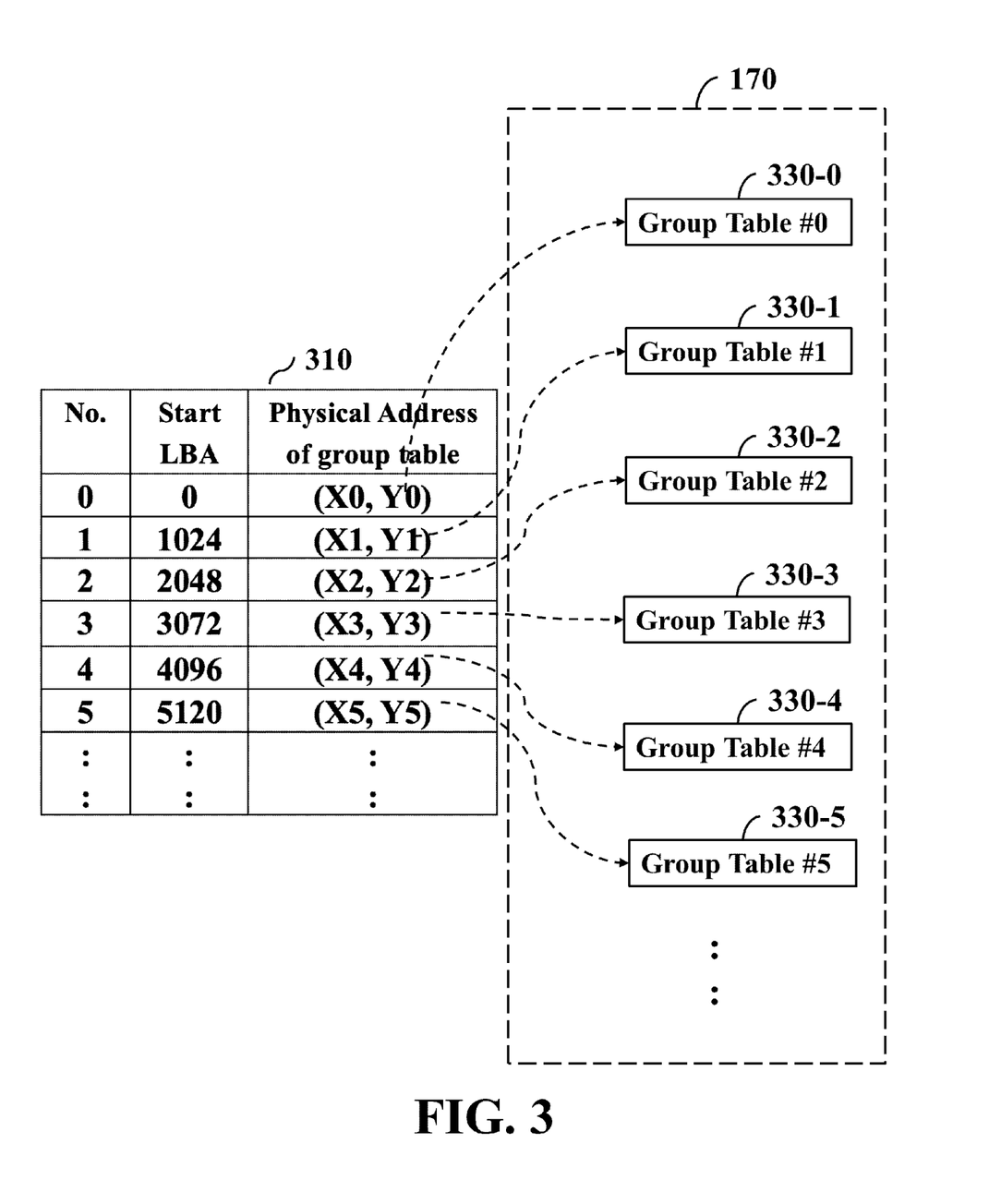
FIG. 3 is a schematic diagram showing a high-level mapping table and group tables.

Refer to FIG. 3. To successfully retrieve the mapping information, the whole L2P table is divided into group tables 330-0 to 330-$n$, where n is a positive integer, and the group tables are stored in the NAND flash memory 170. Each group table 330 records information indicating physical addresses associated with, for example, 1024 Logical Block Addresses (LBAs). For example, the group table 330-0 stores physical-address information about LBA #0 to LBA #1023 in sequence, the group table 330-1 stores physical-address information about LBA #1024 to LBA #2047 in sequence, and so on. The processing unit 131 reads the group mapping tables 330 corresponding to the designated logical addresses from the NAND flash memory 170 through the flash I/F 139, and stores it in the DRAM 150, or a built-in static random access memory (SRAM) of the processing unit 131. To enable the processing unit 131 to read the requisite group tables 330 from the NAND flash memory 170, an embodiment of the invention may provide a high-level mapping table 310 for storing physical-address information of the group tables 330. The logical addresses may be represented by LBAs. For example, the group table 330-0 is stored in the physical address (X0, Y0) of the NAND flash memory 170, the group table 330-1 is stored in the physical address (X1, Y1), and so on. However, the reading of the group tables through the flash I/F 139 consumes the computation capability of the processing unit 11 and the bandwidth of the flash I/F 139. Therefore, how to reduce the number of times the group tables are read from the NAND flash memory 170 becomes an important topic for improving the system performance.

Figure 4:
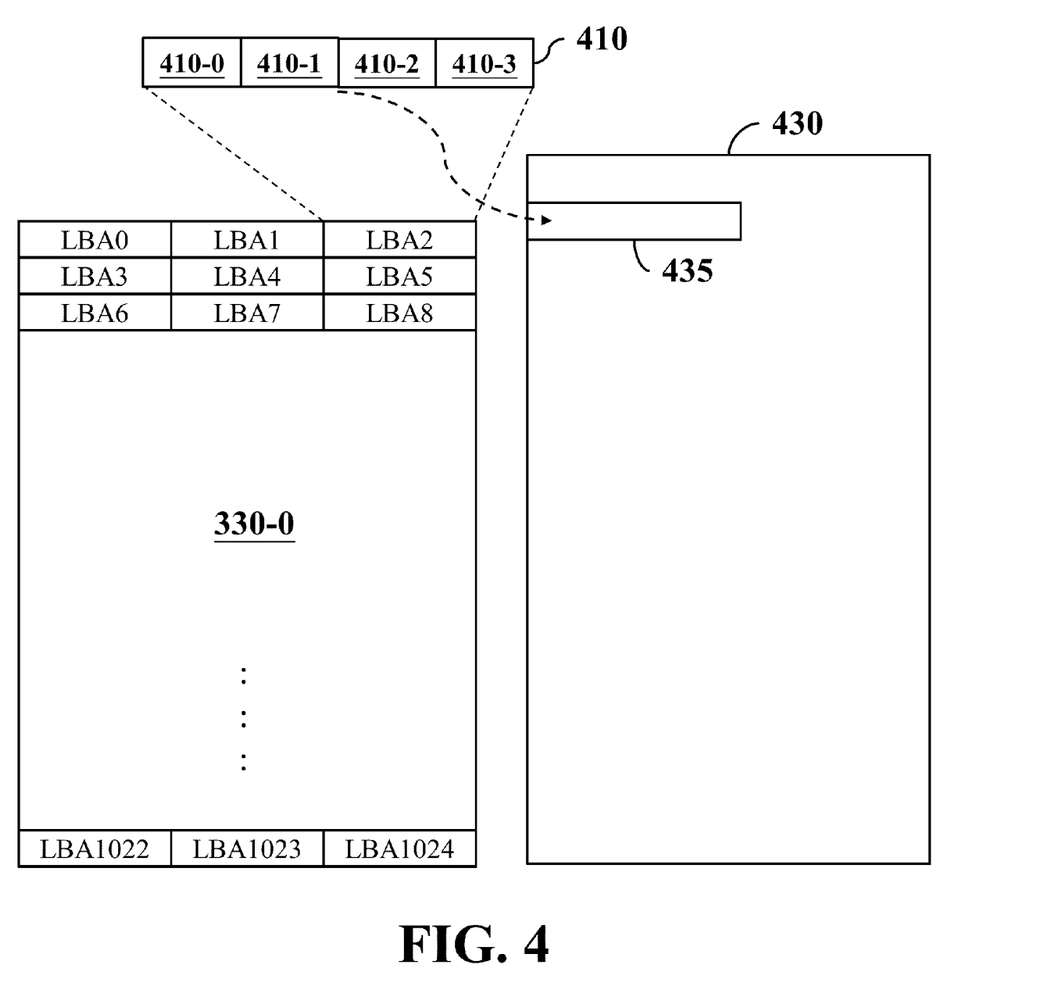
FIG. 4 is a schematic diagram showing a physical storage mapping.

Refer to FIG. 4. Each of the group tables 330, for example, stores physical-address information corresponding to each logical address preferable in sequence. The length of each group table 330 is directly proportional to a total number of the associated logical addresses. Each LBA maps to a preset length of a logical block, such as 512, 4K bytes, etc., with which the corresponding data is stored in a physical address of the NAND flash memory 170. The physical-address information 410 is represented by, for example, four bytes: the first byte 410-0 records a (physical) block number, the second byte 410-1 records (physical) page number and offset, the third byte 410-2 records a (physical) plane number and the last byte 410-3 records a LUN number, a I/O channel number, or others. For example, the physical-address information 410 corresponding to LBA #2 points to a region 435 of a block 430.

Figure 5:
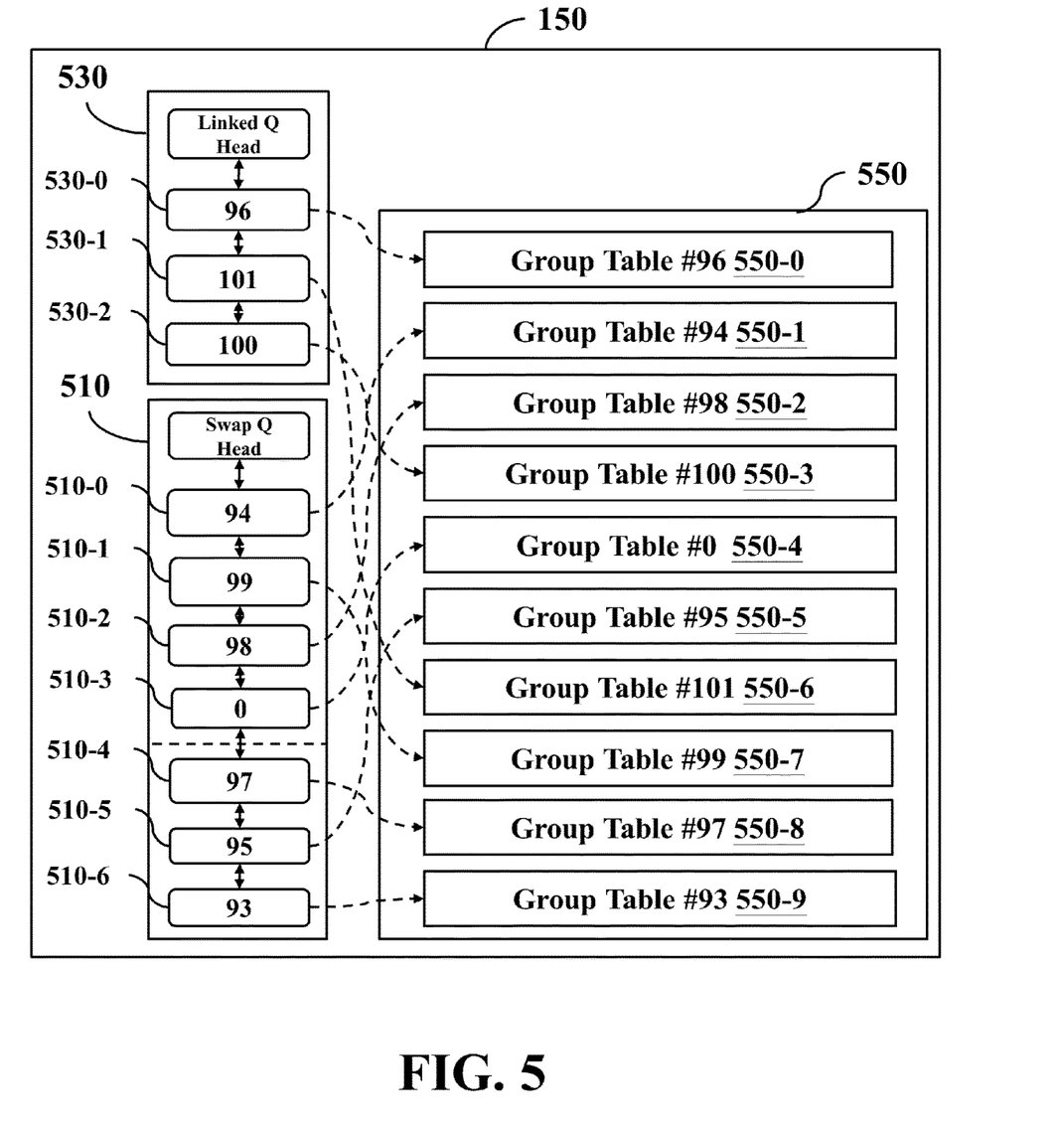
FIG. 5 is a schematic diagram showing an initial state for space allocations and the temporarily stored group tables of a dynamic random access memory (DRAM) according to an embodiment of the invention.

Refer to FIG. 5. The DRAM 150 may allocate space 550 to store less than a predefined quantity of group tables. For example, the space 550 may contain 10 regions 550-0 to 550-9 and the addresses of each region is continuous for storing one group table. To manage group tables stored in the space 550, the DRAM 150 may allocate space 510 for a swap queue and space 530 for a locked queue. The swap queue and the locked queue are preferably realized in bidirectional linked lists. It is also feasible to practice the queues by unidirectional linked lists. Each node of the bidirectional linked list includes two pointers pointing to physical addresses of the prior and the next nodes, and profile data of one group table, such as a group-table number. Thus, one node corresponds to one group table. The processing unit 131 may read profile data of a group table stored in a queue's node and obtain the physical address of the group table accordingly for retrieving the group table. In addition, the quantities of the nodes of the space 510 and 530 are variable, for example, the quantity of the swap nodes of the space 510 may be 10 or 7 while the quantity of the locked nodes of the space 530 may be 0 or 3. A total amount of the nodes of the space 510 and 530 is fixed, such as 10, etc.

The locked queue is used to record profile data about group tables of the space 550 that have been modified but hasn't been programmed into the NAND flash memory 170. In other words, the group tables recorded in the locked queue have been modified and the updated group tables should be as soon programmed into the NAND flash memory 170 as possible. The locked queue may include, for example, 3 locked nodes, such as the nodes 530-0 to 530-2, and each locked node stores the profile data of a group table and two pointers. For example, the locked node 530-0 stores profile data including a group-table number "96" and a physical address (also called start address) of the region 550-0 to indicate that the group table #96 has been modified and the content of the group table #96 is stored in the region 550-0. One pointer (the prior pointer) of the locked node 530-0 points to a start point of the locked queue (or a default value) and the other pointer (the next pointer) thereof is Null. After the locked node 530-1 is created, the next pointer of the locked node 530-0 is updated with the physical address of the locked node 530-1.

The operations of the swap queue are basically the same as that of the locked queue. Rather than the locked queue recording profile data about the group tables that have been modified, the swap queue records profile data about the group tables that haven't been modified. Assume that the group table #96 is used to refer to only and the content thereof is not modified: The profile data about the group table #96 is recorded in the swap queue, for example, the swap node 510-2 of the swap queue. When the content of the group table #96 is modified, the profile data about the group table #96 is recorded in the locked queue, for example, the locked node 530-0 of the locked queue. Thereafter, the processing unit 131 may obtain the physical address of the group table #96 by reading the content of the locked node 530-0 of the locked queue and program the group table #96 into the NAND flash memory 170 to ensure that the updated group table #96 is physically renewed. After the group table #96 is programmed into the NAND flash memory 170, the processing unit 131 preferably records the profile data about the group table #96 in the swap node, for example, the swap node 510-0, and the quantity of locked nodes is decreased by one.

The swap queue contains swap nodes, such as swap nodes 510-0 to 510-6, and each swap node stores the profile data of a group table and two pointers. The swap queue and the locked queue are First-In-First-Out (FIFO) queues, the swap node 510-0 (also referred to as the head node) stores the profile data about the group table that is the latest entered the swap queue, and the swap node 510-6 (also referred to as the tail node) stores the profile data that is earliest entered the swap queue. For example, the content stored in the swap node 510-6 contains the group-table number "93" and the physical address of the region 550-9 to indicate the group table #93 is stored in the region 550-9. In the embodiments, the swap queue is divided into a hot zone and a cold zone. The hot zone contains m swap nodes including the head node, the cold zone contains n swap nodes including the tail node, m and n are positive integers, and m+n is a total amount of the swap nodes of the swap queue. For example, m=4, n=3, such that the hot zone contains swap nodes 510-0 to 510-3 and the cold zone contains swap nodes 510-4 to 510-6.

Assume that FIG. 5 shows an exemplary initial-state: The locked nodes 530-0 to 530-2 of the locked queue store the profile data of the group tables #96, #101 and #100, respectively. The swap nodes 510-0 to 510-3 of the hot zone of the swap queue store the profile data of the group tables #94, #99, #98 and #0, respectively. The swap nodes 510-4 of the cold zone of the swap queue store the profile data of the group tables #97, #95 and #93, respectively.

Figure 6:
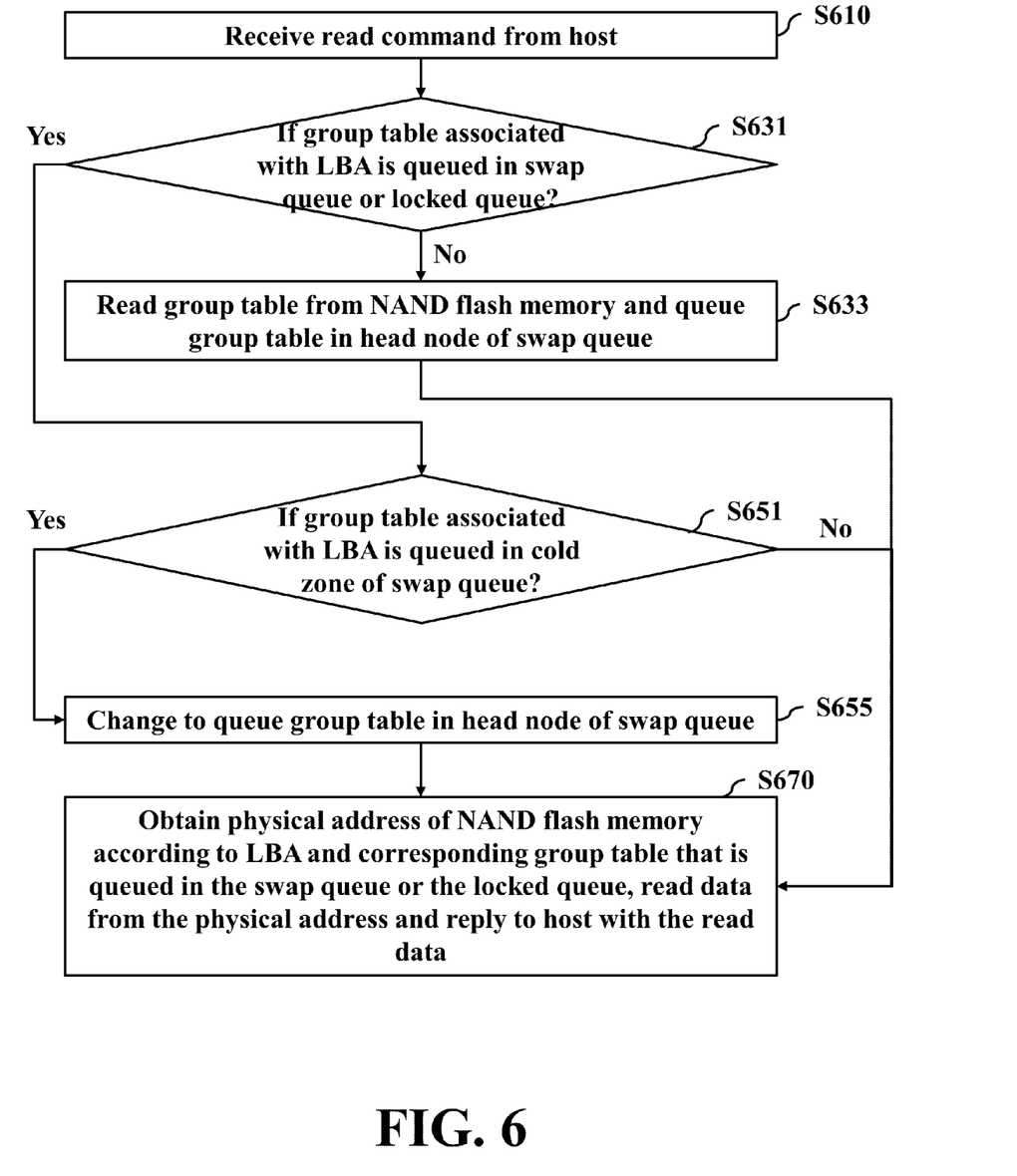
FIG. 6 is a flowchart illustrating a method for dealing with a host read command according to an embodiment of the invention.

FIG. 6 is a flowchart of a method for processing a read command, preferably performed by the processing unit 131. The read command is preferably come from the host 110. The following paragraphs describe how do the processing unit 131 manage group tables recorded in the queues with several use cases to respond to the read command.

Step S610: The processing unit 131 receives a read command including an LBA from the host 110. The processing unit 131 receives the read command from the host 110 through the host I/F 135 and the read command indicates, for example, a start LBA being 90400 and a length being 8, that is, reading data from LBA #90400 to LBA #90407.

Step S631: The processing unit 131 determines whether the group table associated with the LBA is queued in a swap queue or a locked queue. If so, the process proceeds to step S651. Otherwise, the process proceeds to step S633. Since each group table stores data of 1024 entries, the processing unit 131 knows that LBA #90400 corresponds to the group table #88 by directly dividing 90400 by 1024 and LBA #90407 also corresponds to the group table #88 by performing a similar division. The processing unit 131 reads nodes of the locked queue and the swap queue and knows that the group table #88 is not queued in the locked queue or the swap queue. Thus, the processing unit 131 executes step S633. A group table queued in the swap queue or the locked queue indicates that profile data about this group table is stored in one node of the swap queue or the locked queue.

Figure 8:
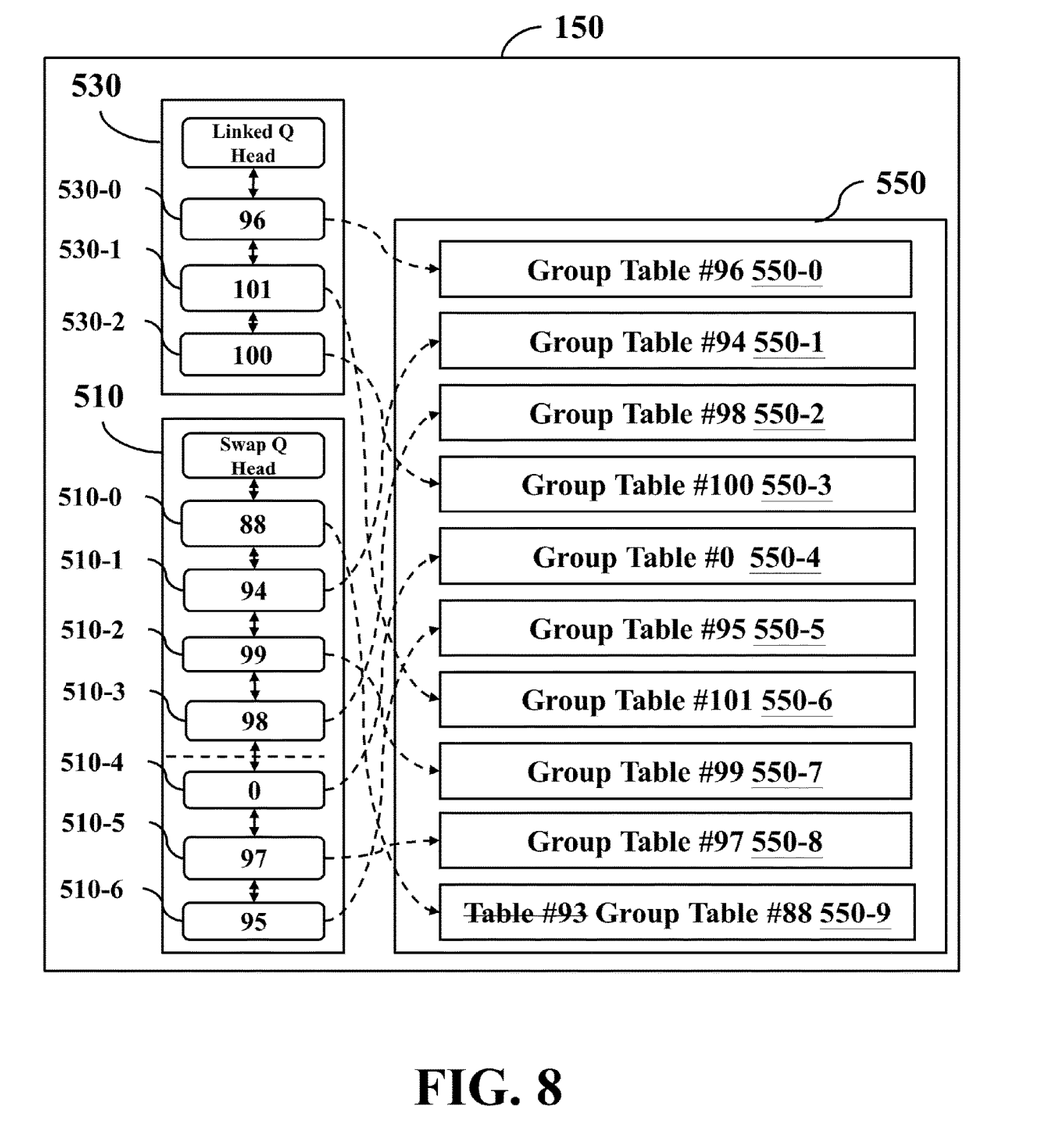
FIGS. 8 to 11 are schematic diagrams showing the updated content of group tables, a locked queue and a swap queues in different use cases according to embodiments of the invention.

Step S633: The processing unit 131 reads the group table from the NAND flash memory 170 and queues the group table in the head node of the swap queue. The processing unit 131 reads the content of the swap queue to know that the swap node 510-6 (the tail node) records the profile data about the group table #93 (that is, the group table #93 is temporarily stored in the region 550-9). The processing unit 131 reads the group table #88 from the NAND flash memory 170, temporarily stores the group table #88 in the region 550-9 and updates the content of the swap node 510-6 with the profile data about the group table #88. After that, the processing unit 131 changes the swap node 510-6 to become the head node (in the hot zone), so that the swap node 510-5 becomes the tail node. At that time, the order of the group tables queued in the swap node is changed to #88, #94, #99, #98, #0, #97 and #95, as shown in FIG. 8.

Step S670: The processing unit 131 obtains a physical address of the NAND flash memory 170 according to the LBA and the corresponding group table that is queued in the swap queue or the locked queue, reads data from the physical address and replies to the host 110 with the read data. The processing unit 131 knows the physical address (or addresses) of the NAND flash memory 170, which corresponds to LBA #90400 to LBA #90407, according to the group table #88 queued in the head node of the swap queue. The processing unit 131 obtains data of LBA #90400 to LBA #90407 by reading the physical address (or addresses) of the NAND flash memory 170 and replies with the read data to the host 110.

Step S651: The processing unit 131 determines whether the group table is queued in the cold zone of the swap queue. If so, the process proceeds to step S655. Otherwise, the process proceeds to step S670. In another situation, assume that the start LBA and the length of the read command are 100 and 8, respectively, that is, reading data from LBA #100 to LBA #107. LBA #100 to LBA #107 corresponds to the group table #0 and the profile data about the group table #0 has been recorded in the swap node 510-3 of the swap queue. Since the swap node 510-3 is located in the hot zone of the swap queue, rather than the cold zone, the processing unit 131 executes step S670. Especially, the processing unit 131 does not change the swap node 510-3 as the head node of the swap queue or the order of the swap nodes 510 of the swap queue, so that the consumption of the system resources for rearranging the swap nodes 510 can be avoided. In still another situation, assume that the associated group table is queued in the locked queue, for example, the group table corresponding to the LBA is the group table #100 and the group table #100 is queued in the locked node 530-2 of the locked queue. The processing unit 131 does not change the locked node 530-2 as the head node of the locked queue or the order of the locked nodes 530 of the locked queue, so that the consumption of the system resources for rearranging the locked nodes 530 can be avoided. In other words, when the above conditions are satisfied, the processing unit 131 executes operations of step S670 directly to imply that the content of the locked queue and swap queue is prohibited from being modified.

Figure 9:
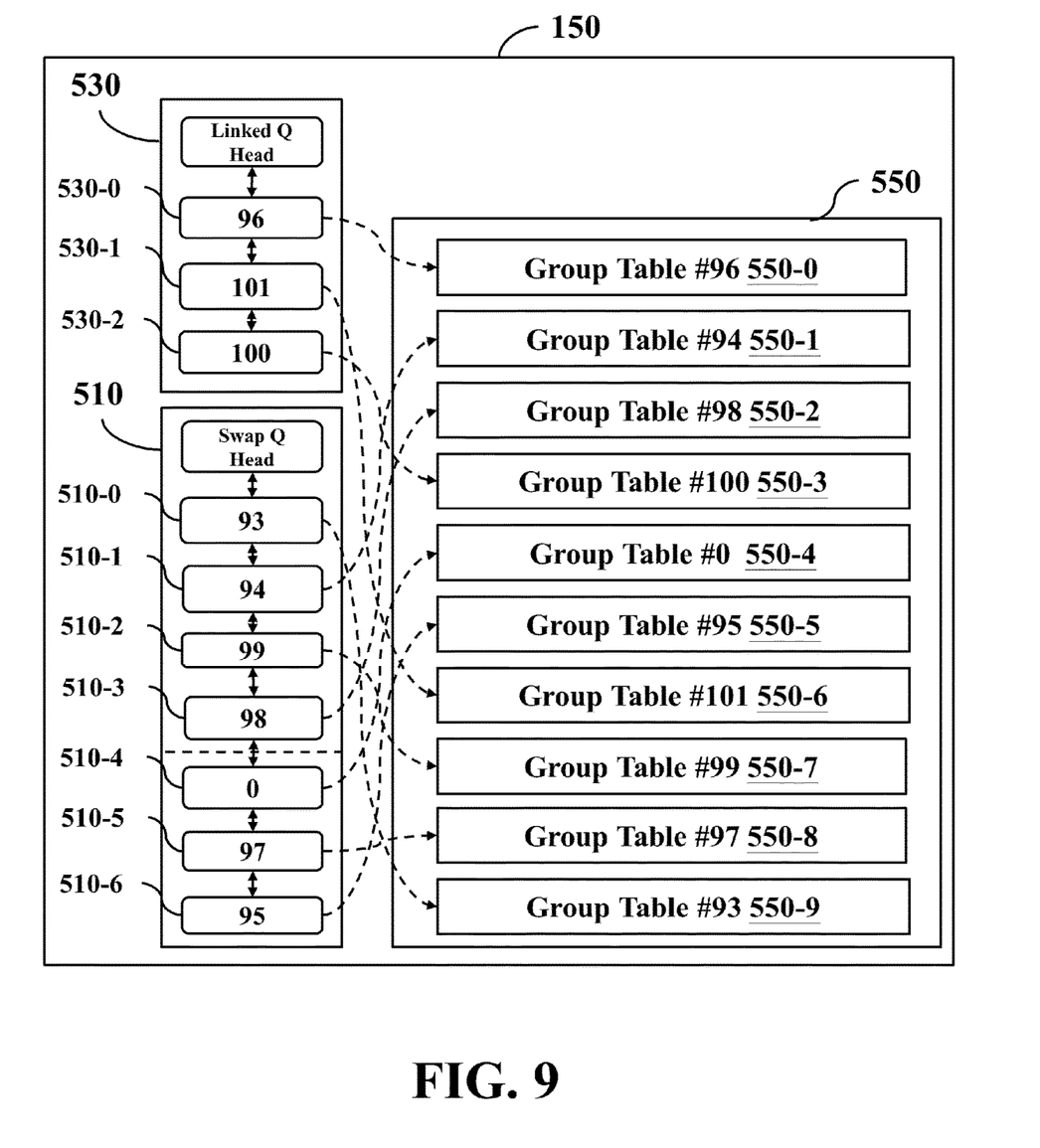

Step S655: The processing unit 131 changes to queue the group table in the head node of the swap queue. In still another situation, assume that the start LBA and the length of the read command are 95300 and 8, respectively, that is, reading data from LBA #95300 to LBA #95307. LBA #95300 to LBA #95307 correspond to the group table #93, the profile data of the group table #93 is recorded in the swap node 510-6 of the swap queue and the swap node 510-6 is located in the cold zone of the swap queue. The processing unit 131 changes the swap node 510-6 as the head node of the swap queue and the swap node 510-5 as the tail node of the swap queue. At that time, the order of the group tables queued in the swap node is changed to #93, #94, #99, #98, #0, #97 and #95, as shown in FIG. 9. In other words, the processing unit 131 moves all the profile data prior to the hit profile data toward to the bottom of the swap queue by one node and stores the hit profile data in the head node of the swap queue.

Figure 7:
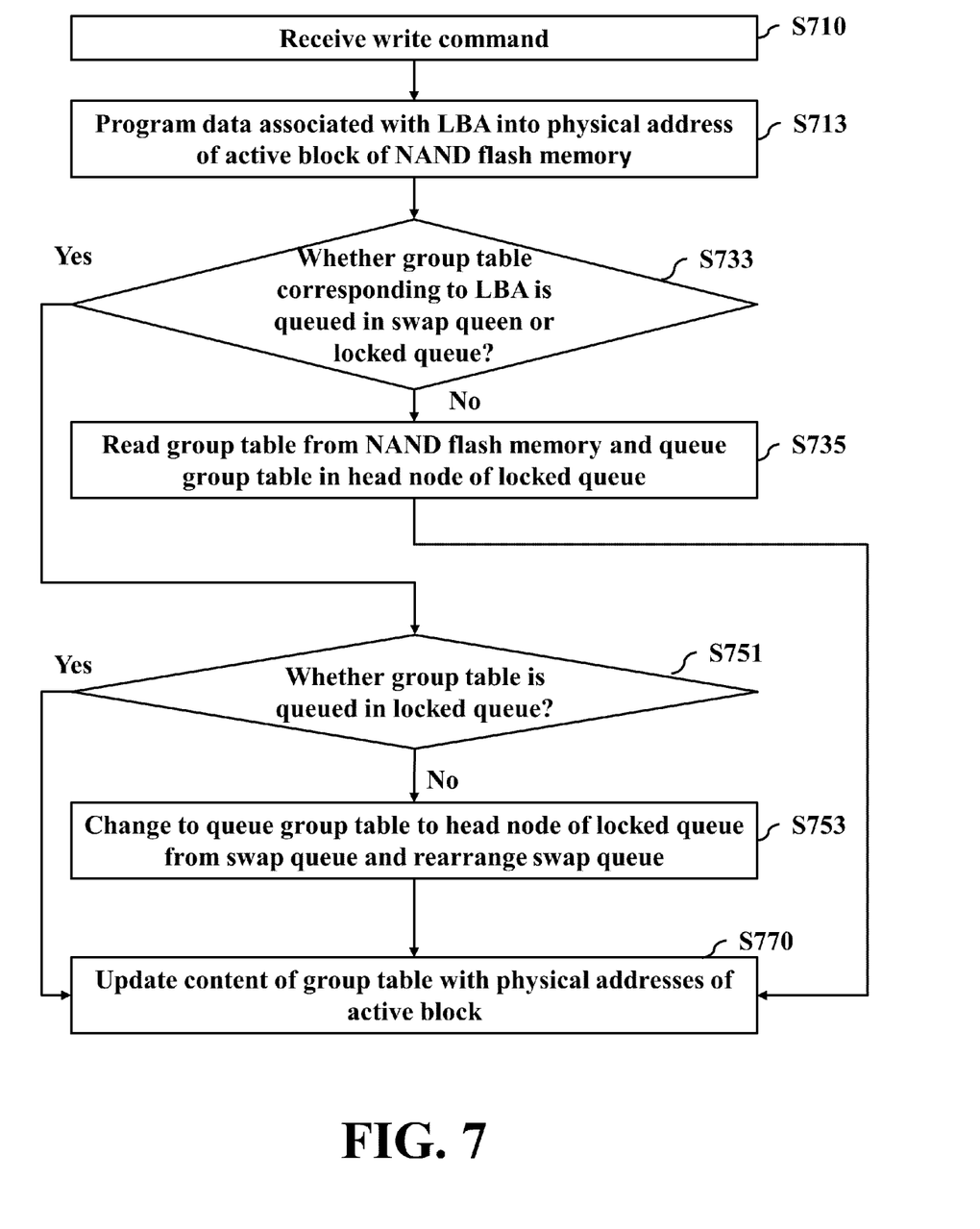
FIG. 7 is a flowchart illustrating a method for dealing with a host write command according to an embodiment of the invention.

FIG. 7 is a flowchart of a method for processing a write command, preferably performed by the processing unit 131. The write command may come from the host 110 or be triggered when the processing unit 131 performs a specific procedure, such as a Garbage Collection (GC) process. The following paragraphs describe how do the processing unit 131 manage group tables queued in the queues with several use cases to respond to the write command. FIG. 5 shows an exemplary initial-state for the use cases.

Step S710: The processing unit 131 receives a write command including a LBA and data associated with the LBA. The write command may come from the host 110 or be triggered when the processing unit 131 performs a specific procedure, such as a Garbage Collection (GC) process. Following the initial-state as shown in FIG. 5, suppose that the write command is issued to write data from LBA #90400 to LBA #90407.

Step S713: The processing unit 131 programs the data associated with the LBA into a physical address of the NAND flash memory 170. The physical blocks of the NAND flash memory 170 may be classified into data blocks and idle blocks in terms of their applications. The data blocks are physical blocks that are full of data, that is, no data can be programmed into. The idle blocks are physical blocks that data can be programmed into. The idle when being selected to program data is also referred to as the active block. The physical address is preferably a page or sector address of the active block.

Step S733: The processing unit 131 determines whether the group table corresponding to the LBA is queued in the swap queue or the locked queue. If so, the process proceeds to step S751. Otherwise, the process proceeds to step S735. Since both LBA #90400 and LBA #90407 correspond to the group table #88, the processing unit 131 reads nodes of the locked queue and the swap queue and knows that the group table #88 is not queued in the locked queue or the swap queue. Therefore, the processing unit 131 executes step S735.

Figure 10:
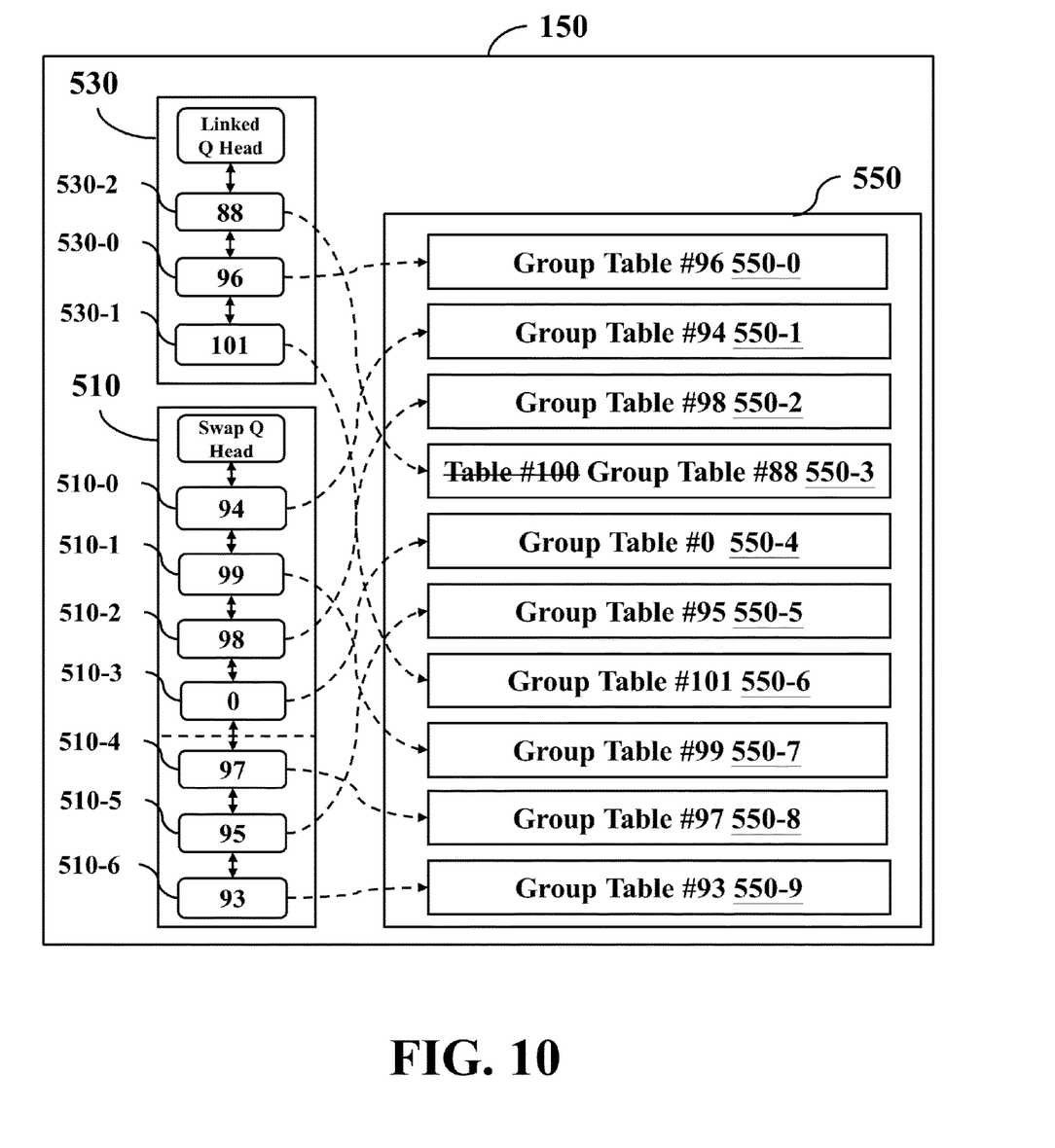

Step S735: The processing unit 31 reads the group table from the NAND flash memory 170 and queues the group table in the head node of the locked queue. The processing unit 131 reads the group table #88 from the NAND flash memory 170, temporarily stores the group table #88 in the region 550-3, updates the content of the locked node 530-2 (the tail node) with the profile data about the group table #88 and changes the locked node 530-2 to the head node of the locked queue. At that time, the nodes of the locked queue are the locked nodes 530-2, 530-0 and 530-1 in sequence, the order of the group tables queued in the locked node is changed to #88, #96 and #101, as shown in FIG. 10.

Step S751: The processing unit 131 determines whether the group table is queued in the locked queue. If so, the process proceeds to step S770. Otherwise, the process proceeds to step S753.

Figure 11:
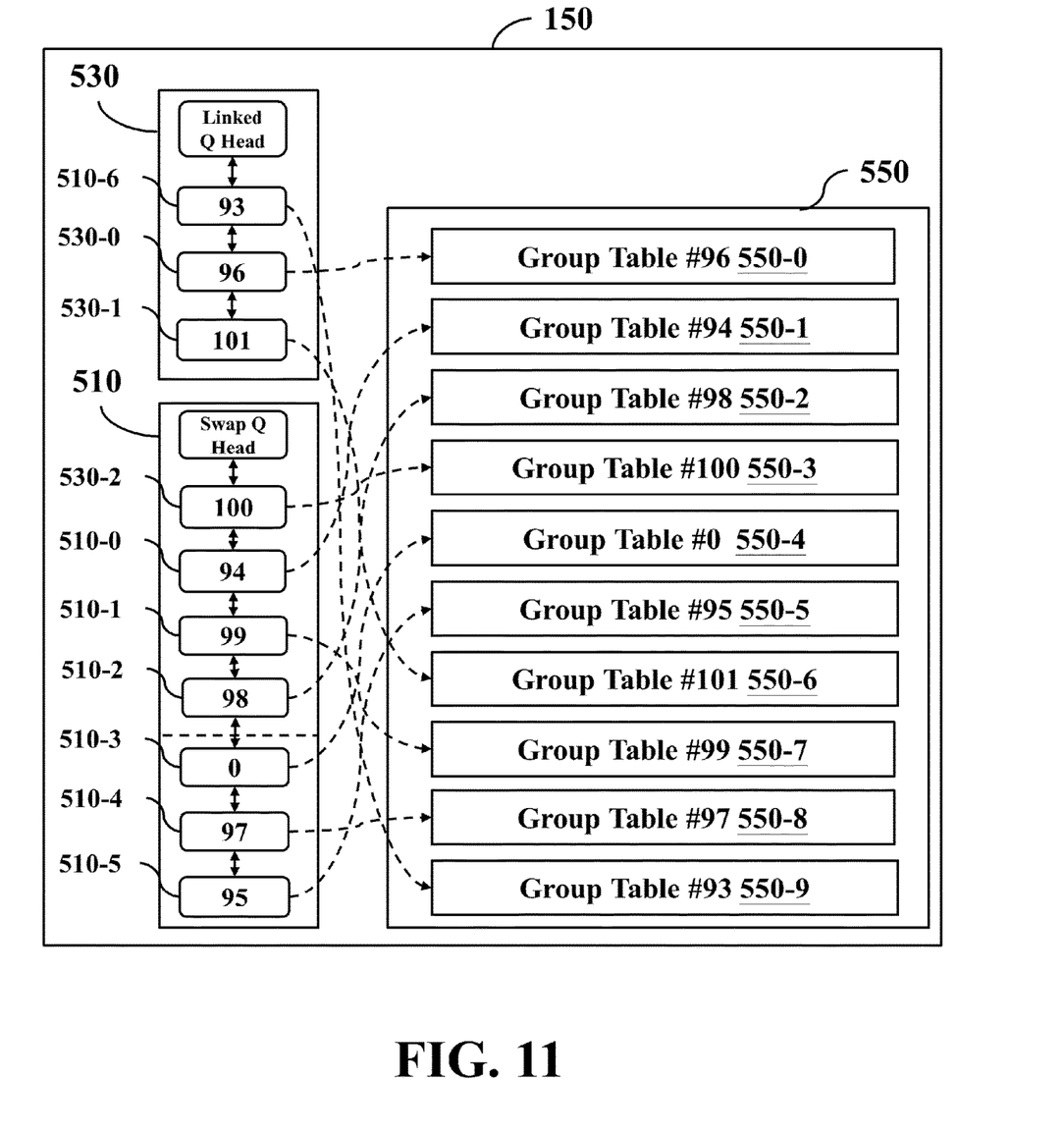

Step S753: The processing unit 131 changes to queue the group table in the head node of the locked queue from the swap queue and rearranges the swap queue. Suppose that the group table corresponding to the LBA is the group table #93 and the profile data of the group table #93 is recorded in the swap node 510-6 of the swap queue. Since the group table #93 will be updated, the processing unit 131 changes to queue the group table #93 to the locked queue and put it to the head node of the locked queue. To change to queue the group table #93 to the locked queue, the processing unit 131 programs the group table #100 into the NAND flash memory 170 and changes the locked node 530-2 to the head node of the swap queue. Meanwhile, a total amount of the swap nodes of the swap queue is updated to 8 from 7 and a total amount of the locked nodes of the locked queue is updated to 2 from 3. Next, the processing unit 131 changes the swap node 510-6 to the head node of the locked queue. Meanwhile, the locked queue contains the swap node 510-6, the locked node 530-0 and the locked node 530-1 in sequence, a total amount of the swap nodes of the swap queue is updated to 7 from 8 and a total amount of the locked nodes of the locked queue is updated to 3 from 2, as shown in FIG. 11.

Step S770: The processing unit 131 updates the content of the group table with the physical address of the active block. The processing unit 131 updates the content of the group table with the physical addresses of the active block that the data has been programmed into, that is, the physical addresses corresponding to LBA #90400 to LBA #90407 are updated with the physical addresses of the active block.

In alternative embodiments, in step S770, the processing unit 131 determines whether to perform the update with further references made to a write condition.

Although the flowchart of FIG. 7 is employed to deal with a host write command, the management mechanism for the group tables and the queues is also applied to any process that may update the content of the group table, such as a Garbage Collection (CG) process, a Wear Leveling (WL) process, etc., and the invention should not be limited thereto. The execution illustrated in FIG. 7, the GC process and the WL process may be referred to data write operations.

After any locked node has presented in the locked queue, the processing unit 131 may obtain the updated group tables, such as the group table #88 or #93, according to the profile data sequentially recorded in the locked nodes and program the updated group tables into the NAND flash memory 170. After the updated group table has been programmed into the NAND flash memory 170, the processing unit 131 may change the locked node of the locked queue to a swap node of the swap queue. Meanwhile, a total amount of the swap nodes of the swap queue is changed to 10 from 7 and a total amount of the locked nodes of the locked queue is changed to 0 from 3. Or, the processing unit 131 may use a flag to mark whether a group table corresponding to a locked node has been programmed into the NAND flash memory 170. If so, the flag stores "0". Otherwise, the flag stores "1". That is, even a group table corresponding to a locked node has been programmed into the NAND flash memory 170, the locked node is maintained in the locked queue. Thereafter, since a group table corresponding to a LBA is queued in the locked node when executing the next read or write command, the processing unit 131 can execute the read or write command with references made to the locked nodes directly without a further reading of the group table corresponding to the group table from the NAND flash memory 170.

In alternative embodiments, the processing unit 131 may determine whether to program the updated group tables into the NAND flash memory 170 according to a write condition, such as, if a total amount of the nodes of the locked queue equals the maximum value or a threshold, or a total amount of the nodes of the swap queue equals the maximum value or a threshold, or others.

Some or all of the aforementioned embodiments of the method of the invention may be implemented in a computer program such as a driver for a dedicated hardware of a controller, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIG. 1, it should be noted that additional elements may be included to achieve better performance without departing from the spirit of the invention. Each element of FIG. 1 is composed of various circuits and arranged to operably perform the aforementioned operations. While the process flows described in FIGS. 6 and 7 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling data access to a flash memory, performed by a processing unit, comprising:
   obtaining a first logical address associated with a data read operation;
   determining whether a first group table corresponding to the first logical address is queued in a locked queue, or a hot zone of a swap queue; and
   prohibiting content of the locked queue and the swap queue from being modified when the first group table corresponding to the first logical address is queued in the locked queue, or the hot zone of the swap queue,
   wherein the locked queue stores profile data about a group table of a random access memory (RAM) that has been modified but hasn't been programmed into a NAND flash memory; the swap queue stores profile data about a group table of the RAM that hasn't been modified and comprises the hot zone and a cold zone; the hot zone comprises m nodes from the top of the swap queue; the cold zone comprises n nodes from the bottom of the swap queue; each node records profile data of one group table; and each profile data comprises a group-table number and a start address pointing to the corresponding group table stored in the RAM.

2. The method of claim 1, comprising:
   changing to queue the first group table in a head node of the swap queue when the first group table corresponding to the first logical address is queued in the cold zone of the swap queue.

3. The method of claim 1, comprising:
   reading the first group table from the NAND flash memory and changing to queue the first group table to a head node of the swap queue when the first group table corresponding to the first logical address is not stored in the RAM.

4. The method of claim 1, comprising:
obtaining a second logical address associated with a data write operation;
determining whether a second group table corresponding to the second logical address is queued in the swap queue; and
moving hit profile data from the swap queue to the locked queue and rearranging the order of profile data of the swap queue when the second group table corresponding to the second logical address is queued in the swap queue.

5. The method of claim 4, comprising:
reading the second group table from the NAND flash memory and queuing the second group table in a head node of the locked queue when the second group table corresponding to the second logical address is not stored in the RAM.

6. The method of claim 1, wherein space of the RAM is insufficient to store all group tables, and each group table stores information indicating which physical locations user data of continuous logical locations are actually stored in.

7. A non-transitory computer program product for data access to a flash memory when executed by a processing unit, the non-transitory computer program product comprising program code to:
obtain a first logical address associated with a data read operation;
determine whether a first group table corresponding to the first logical address is queued in a locked queue, or a hot zone of a swap queue; and
prohibit content of the locked queue and the swap queue from being modified when the first group table corresponding to the first logical address is queued in the locked queue, or the hot zone of the swap queue,
wherein the locked queue stores profile data about a group table of a random access memory (RAM) that has been modified but hasn't been programmed into a NAND flash memory; the swap queue stores profile data about a group table of the RAM that hasn't been modified and comprises the hot zone and a cold zone; the hot zone comprises m nodes from the top of the swap queue; the cold zone comprises n nodes from the bottom of the swap queue; each node records profile data of one group table; and each profile data comprises a group-table number and a start address pointing to the corresponding group table stored in the RAM.

8. The non-transitory computer program product of claim 7, comprising program code to:
change to queue the first group table in a head node of the swap queue when the first group table corresponding to the first logical address is queued in the cold zone of the swap queue.

9. The non-transitory computer program product of claim 7, comprising program code to:
read the first group table from the NAND flash memory and change to queue the first group table to a head node of the swap queue when the first group table corresponding to the first logical address is not stored in the RAM.

10. The non-transitory computer program product of claim 7, comprising program code to:
obtain a second logical address associated with a data write operation;
determine whether a second group table corresponding to the second logical address is queued in the swap queue; and
move hit profile data from the swap queue to the locked queue and rearranging the order of profile data of the swap queue when the second group table corresponding to the second logical address is queued in the swap queue.

11. The non-transitory computer program product of claim 10, comprising program code to:
read the second group table from the NAND flash memory and queue the second group table in a head node of the locked queue when the second group table corresponding to the second logical address is not stored in the RAM.

12. The non-transitory computer program product of claim 10, comprising program code to:
determine whether the second group table corresponding to the second logical address is queued in the locked queue; and
prohibit content of the locked queue from being modified when the second group table corresponding to the second logical address is queued in the locked queue.

13. The non-transitory computer program product of claim 7, wherein space of the RAM is insufficient to store all group tables, and each group table stores information indicating which physical locations user data of continuous logical locations are actually stored in.

14. An apparatus for controlling data access to a flash memory, comprising:
a random access memory (RAM), arranged to operably store a plurality of group tables;
a processing unit, coupled to the RAM, arranged to operably obtain a first logical address associated with a data read operation; determine whether a first group table corresponding to the first logical address is queued in a locked queue, or a hot zone of a swap queue; and prohibit content of the locked queue and the swap queue from being modified when the first group table corresponding to the first logical address is queued in the locked queue, or the hot zone of the swap queue,
wherein the locked queue stores profile data about a group table of the RAM that has been modified but hasn't been programmed into a NAND flash memory; the swap queue stores profile data about a group table of the RAM that hasn't been modified and comprises the hot zone and a cold zone; the hot zone comprises m nodes from the top of the swap queue; the cold zone comprises n nodes from the bottom of the swap queue; each node records profile data of one group table; and each profile data comprises a group-table number and a start address pointing to the corresponding group table stored in the RAM.

15. The apparatus of claim 14, wherein the processing unit is arranged to operably change to queue the first group table in a head node of the swap queue when the first group table corresponding to the first logical address is queued in the cold zone of the swap queue.

16. The apparatus of claim 14, wherein the processing unit is arranged to operably read the first group table from the NAND flash memory and change to queue the first group table to a head node of the swap queue when the first group table corresponding to the first logical address is not stored in the RAM.

17. The apparatus of claim 16, wherein the processing unit is arranged to operably obtain a second logical address associated with a data write operation; determine whether a second group table corresponding to the second logical address is queued in the swap queue; and move hit profile data from the swap queue to the locked queue and rearranging the order of profile data of the swap queue when the second group table corresponding to the second logical address is queued in the swap queue.

18. The apparatus of claim 17, wherein the processing unit is arranged to operably read the second group table from the NAND flash memory and queue the second group table in a head node of the locked queue when the second group table corresponding to the second logical address is not stored in the RAM.

19. The apparatus of claim 17, wherein the processing unit is arranged to operably determine whether the second group table corresponding to the second logical address is queued in the locked queue; and prohibit content of the locked queue from being modified when the second group table corresponding to the second logical address is queued in the locked queue.

20. The apparatus of claim 14, wherein space of the RAM is insufficient to store all group tables, and each group table stores information indicating which physical locations user data of continuous logical locations are actually stored in.

* * * * *